United States Patent
Hayashi et al.

(10) Patent No.: US 9,768,622 B2
(45) Date of Patent: Sep. 19, 2017

(54) NON-CONTACT POWER TRANSMITTING AND RECEIVING SYSTEM

(71) Applicant: TOYOTA JIDOSHA KABUSHIKI KAISHA, Toyota-shi, Aichi-ken (JP)

(72) Inventors: Yuji Hayashi, Kasugai (JP); Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 387 days.

(21) Appl. No.: 14/642,350

(22) Filed: Mar. 9, 2015

(65) Prior Publication Data

US 2015/0303703 A1 Oct. 22, 2015

(30) Foreign Application Priority Data

Apr. 22, 2014 (JP) ................................. 2014-088097

(51) Int. Cl.
*H01F 37/00* (2006.01)
*H02J 5/00* (2016.01)
(Continued)

(52) U.S. Cl.
CPC .............. *H02J 5/005* (2013.01); *H02J 7/022* (2013.01); *H02J 7/025* (2013.01); *H02J 50/12* (2016.02);
(Continued)

(58) Field of Classification Search
None
See application file for complete search history.

(56) References Cited

U.S. PATENT DOCUMENTS 6,430,064 B1 * 8/2002 Tsuchimoto ............ H02J 5/005
363/22
7,741,734 B2 6/2010 Joannopoulos et al.
(Continued)

FOREIGN PATENT DOCUMENTS

AU 2006269374 B2 1/2007
AU 2006269374 C1 1/2007
(Continued)

OTHER PUBLICATIONS

Bosshard et al., "Comparative Evaluation of Control Methods for Inductive Power Transfer," International Conference on Renewable Energy Research and Applications (ICRERA), IEEE, Nov. 11, 2012, pp. 1-6.

*Primary Examiner* — Long Nguyen
(74) *Attorney, Agent, or Firm* — Oliff PLC

(57) ABSTRACT

A non-contact power transmitting and receiving system includes an inverter configured to generate a high-frequency voltage, a voltage-current sensor configured to detect a phase difference between an output voltage and an output current of the inverter, a power transmission coil connected to the inverter, a power reception coil configured to receive electric power from the power transmission coil in a contactless manner, a rectifier circuit connected to the power reception coil, and a control unit configured to control the inverter and the rectifier circuit. The inverter includes arms. The rectifier circuit includes arms. The control unit adjusts at least one of switching timing of any arm of the inverter and switching timing of any arm of the rectifier circuit, in accordance with the phase difference detected by the voltage-current sensor.

5 Claims, 12 Drawing Sheets

(51) Int. Cl.
  *H02J 7/02* (2016.01)
  *H02J 50/12* (2016.01)
  *H02M 3/335* (2006.01)
  *H02M 3/337* (2006.01)
  *H02M 1/00* (2006.01)

(52) U.S. Cl.
  CPC ...... *H02M 3/3378* (2013.01); *H02M 3/33576* (2013.01); *H02M 2001/0003* (2013.01); *Y02B 40/90* (2013.01)

(56) References Cited

U.S. PATENT DOCUMENTS

| | | |
|---|---|---|
| 2007/0222542 A1 | 9/2007 | Joannopoulos et al. |
| 2008/0157909 A1* | 7/2008 | Chen ................ H02M 3/33523 336/105 |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0199045 A1 | 8/2011 | Hui et al. |
| 2011/0254379 A1 | 10/2011 | Madawala |
| 2013/0127409 A1 | 5/2013 | Ichikawa |
| 2013/0193749 A1 | 8/2013 | Nakamura et al. |
| 2015/0008877 A1 | 1/2015 | Ichikawa et al. |
| 2015/0028691 A1* | 1/2015 | Yamauchi ............... H02J 5/005 307/104 |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-2002-272134 | 9/2002 |
| JP | A-2009-501510 | 1/2009 |
| JP | A-2012-130173 | 7/2012 |
| JP | A-2013-110822 | 6/2013 |
| JP | A-2013-126327 | 6/2013 |
| JP | A-2013-146148 | 7/2013 |
| JP | A-2013-146154 | 7/2013 |
| JP | A-2013-154815 | 8/2013 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |

\* cited by examiner

NON-CONTACT POWER TRANSMITTING AND RECEIVING SYSTEM

This nonprovisional application is based on Japanese Patent Application No. 2014-088097 filed on Apr. 22, 2014 with the Japan Patent Office, the entire contents of which are hereby incorporated by reference.

BACKGROUND OF THE INVENTION

Field of the Invention

The present invention relates to a non-contact power transmitting and receiving system.

Description of the Background Art

A non-contact power transmitting and receiving system which supplies electric power to a load in a contactless manner is applied for charging a portable electronic apparatus, an electric vehicle and the like. In the non-contact power transmitting and receiving system, electric power is transmitted through a high-frequency power supply, a power transmission unit, a power reception unit, a rectification unit, and a load in the order presented.

In the non-contact power transmitting and receiving system, variable factors in transmission efficiency, such as variations in an equivalent resistance component of the load, variations in coupling coefficient due to misalignment when aligning the power transmission unit and the power reception unit, and variations in LC constant in the power transmission unit or the power reception unit, may occur. Some techniques have been proposed in which, even if these variable factors occur, the power factor of electric power supplied from the high-frequency power supply is maintained favorably to perform efficient power transfer.

Japanese Patent Laying-Open No. 2002-272134 discloses a technique in which, in a non-contact charging system, an inverter used for a high-frequency power supply has a variable frequency for improving transmission efficiency. Japanese Patent Laying-Open No. 2012-130173 discloses a technique for adjusting capacitor capacitance for improving transmission efficiency.

As shown in Japanese Patent Laying-Open No. 2002-272134, however, when the frequency of the inverter on the power transmitting side is changed, the inverter frequency disadvantageously deviates from set frequency (resonance frequency) of a resonant circuit or a filter circuit to degrade frequency characteristics of a power transmission path, resulting in reduced transmission efficiency. When providing an additional circuit for adjusting capacitor capacitance on a power transmission path as described in Japanese Patent Laying-Open No. 2012-130173, the system will be increased in size because of the addition of the circuit, resulting in increased installation space and increased cost.

SUMMARY OF THE INVENTION

The present invention was made to solve the above-described problems, and has an object to provide a non-contact power transmitting and receiving system capable of improving efficiency of power transfer in correspondence with variable factors in transmission efficiency, while suppressing size increase of the system and cost increase.

In summary, the present invention is directed to a non-contact power transmitting and receiving system, including an inverter configured to generate a high-frequency voltage from a DC power supply on a power transmitting side, a detection device configured to detect a phase difference between an output voltage and an output current of the inverter, a power transmission coil connected to the inverter, a power reception coil configured to receive electric power from the power transmission coil in a contactless manner, a rectifier circuit configured to rectify AC power received at the power reception coil to a direct current, and a control unit configured to control the inverter and the rectifier circuit. The inverter includes a plurality of arms connected in parallel across a power transmitting-side positive line and a power transmitting-side negative line which are supplied with a DC voltage from the DC power supply on the power transmitting side. The rectifier circuit includes a plurality of other arms connected in parallel across a power receiving-side positive line and a power receiving-side negative line which are supplied with a DC voltage rectified by the rectifier circuit. The control unit adjusts at least one of switching timing of any arm of the inverter and switching timing of any arm of the rectifier circuit, in accordance with the phase difference detected by the detection device.

With the above-described configuration, it is possible to improve the power factor of the inverter merely by changing the switching timing, without changing the inverter frequency or providing an additional circuit for a power transmission unit or a power reception unit.

Preferably, the inverter includes a first arm and a second arm as the plurality of arms. When the output current of the inverter is delayed in phase from the output voltage of the inverter, the control unit controls the inverter such that the switching timing of the first arm leads a reference clock for the inverter.

With the above-described control, improvement in power factor when the inverter current is delayed in phase from the voltage can be achieved.

Preferably, the rectifier circuit includes a third arm and a fourth arm as the plurality of other arms. When the output current of the inverter leads in phase the output voltage of the inverter, the control unit controls the rectifier circuit such that the switching timing of the third arm is delayed from a reference clock for the rectifier circuit.

With the above-described control, improvement in power factor when the inverter current leads the voltage in phase can be achieved.

The third arm includes two switching elements connected in series across the power receiving-side positive line and the power receiving-side negative line. The fourth arm includes two diodes connected in series across the power receiving-side positive line and the power receiving-side negative line.

With the above-described configuration, the rectifier circuit can have a simple configuration.

The rectifier circuit includes a third arm and a fourth arm as the plurality of other arms. In accordance with the phase difference detected by the detection device, the control unit controls the rectifier circuit such that the switching timing of the third arm is delayed from and the switching timing of the fourth arm leads a reference clock for the rectifier circuit.

With the above-described control, the power factor of the inverter can be improved merely by changing the switching timing of the rectifier circuit without changing the switching timing of the inverter.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
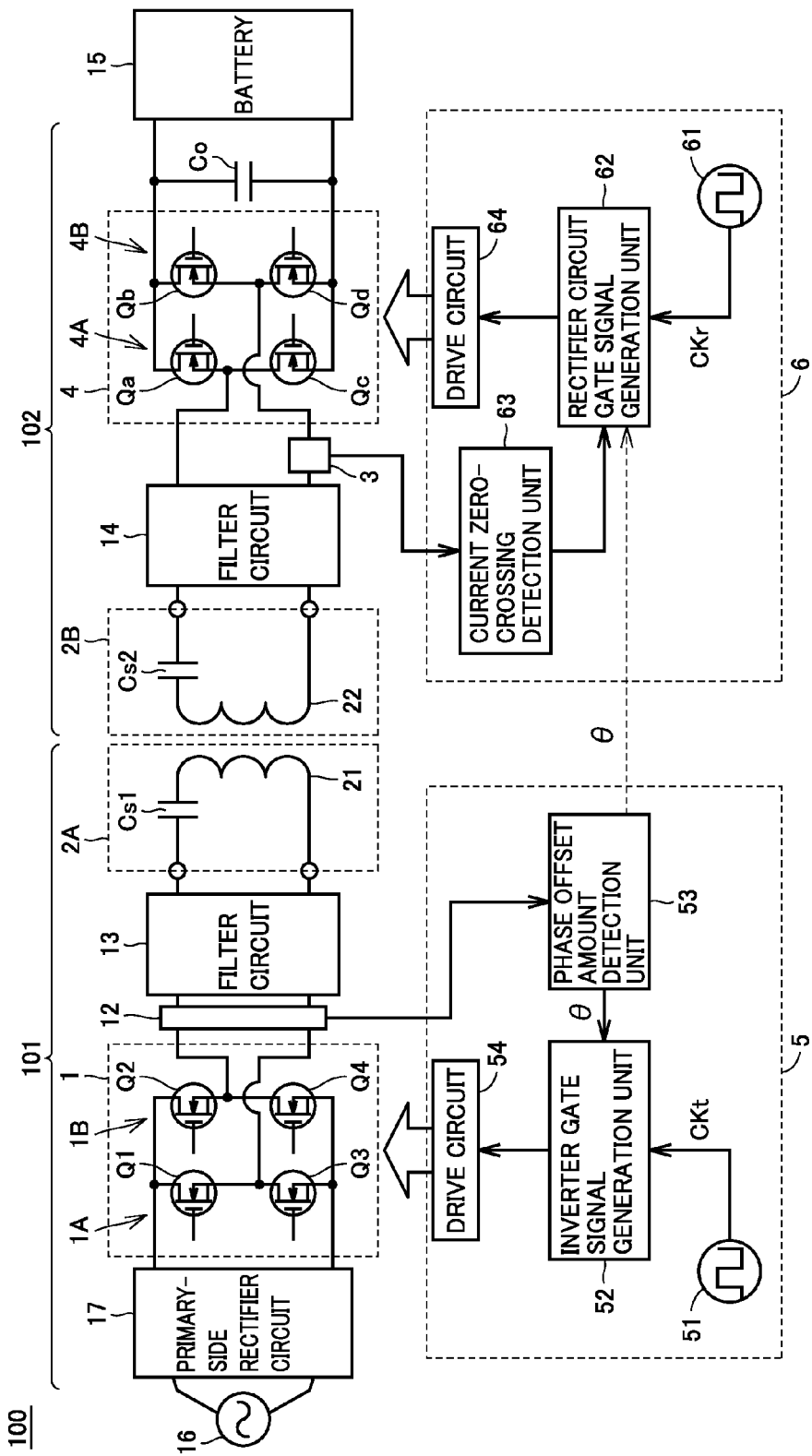
FIG. 1 is an overall configuration diagram of a non-contact power transmitting and receiving system of a first embodiment.

The embodiments of the present invention will be hereinafter described in detail with reference to the drawings, in which the same or corresponding components are designated by the same reference characters, and description thereof will not be repeated.

First Embodiment

FIG. 1 is an overall configuration diagram of a non-contact power transmitting and receiving system of a first embodiment. Referring to FIG. 1, a non-contact power transmitting and receiving system 100 includes a power transmitting apparatus 101 and a power receiving apparatus 102.

Power transmitting apparatus 101 includes a high-frequency inverter 1, a voltage-current sensor 12 detecting an output voltage and an output current of high-frequency inverter 1, a filter circuit 13, a power transmission unit 2A, and a power transmitting-side controller 5. High-frequency inverter 1 includes arms 1A and 1B connected in parallel to each other across a positive electrode power line and a negative electrode power line supplied with a DC voltage from a DC power supply (a primary-side rectifier circuit 17) on the power transmitting side. Arm 1A includes switching elements Q1 and Q3 connected in series. Arm 1B includes switching elements Q2 and Q4 connected in series.

Power receiving apparatus 102 includes a power reception unit 2B, a filter circuit 14, a rectifier circuit 4, an input current sensor 3 detecting an input current to rectifier circuit 4, a smoothing capacitor C0, a battery 15, and a power receiving-side controller 6. Rectifier circuit 4 includes arms 4A and 4B connected in parallel to each other across a positive electrode power line and a negative electrode power line on the power receiving-side supplied with a DC voltage rectified by rectifier circuit 4. Arm 4A includes switching elements Qa and Qc connected in series. Arm 4B includes switching elements Qb and Qd connected in series.

High-frequency inverter 1 receives DC power obtained by rectifying AC power of a commercial power supply 16 by primary-side rectifier circuit 17. High-frequency inverter 1 generates an alternating current of a frequency suitable for power transfer.

The AC power output from high-frequency inverter 1 is received by power reception unit 2B in a contactless manner via filter circuit 13 and power transmission unit 2A. The electric power received at power reception unit 2B passes through filter circuit 14 and is rectified in rectifier circuit 4, and is then supplied to battery 15 as charging power.

In power transmitting apparatus 101, AC power having a predetermined transmission frequency is supplied from high-frequency inverter 1 to power transmission unit 2A via filter circuit 13. Power transfer is performed in a contactless manner from power transmission unit 2A to power reception unit 2B of power receiving apparatus 102. Power transmission unit 2A and power reception unit 2B are designed to include coils 21, 22 and capacitors Cs1, Cs2, respectively, and to resonate at the transmission frequency. A Q value showing the intensity of resonance between power transmission unit 2A and power reception unit 2B is preferably more than or equal to 100.

In the non-contact charging system of such configuration, off-resonance caused by variations in load, variations in coupling coefficient, variations in constant of a power feed coil and a capacitor for power factor compensation, or the like may result in reduced efficiency. In such a case, the power factor of the input current and voltage of the high-frequency inverter does not assume 1, with the result that efficiency of electric power consumed by the load is lower than apparent power (voltage×current) supplied by the inverter.

Changing the frequency of inverter 1 or providing a circuit for switching capacitor capacitance on a power transmission path as described above in order to improve such reduction in power factor exerts an adverse effect. Therefore, in the present embodiment, the phase of switching in inverter 1 or rectifier circuit 4 is adjusted to improve the power factor. A configuration therefor will be described now.

Power transmitting-side controller 5 includes a reference clock generation circuit 51, a phase offset amount detection unit 53, an inverter gate signal generation unit 52, and a drive circuit 54. Power receiving-side controller 6 includes a reference clock generation circuit 61, a current zero-crossing detection unit 63, a rectifier circuit gate signal generation unit 62, and a drive circuit 64.

Phase offset amount detection unit 53 detects a phase difference between an output current and an output voltage of inverter 1 detected by voltage-current sensor 12, as a phase offset amount θ. Detected phase offset amount θ is sent to inverter gate signal generation unit 52, and is also sent to rectifier circuit gate signal generation unit 62 of power receiving-side controller 6 by communication or the like according to necessity.

Inverter gate signal generation unit 52 adjusts the shift amount of the phase of some inverter gate signals from a reference clock CKt based on phase offset amount θ. Drive circuit 54 drives the gates of the switching elements of inverter 1 based on the gate signal generated by inverter gate signal generation unit 52.

Current zero-crossing detection unit 63 detects a current zero crossing point based on the detected value of input current sensor 3. Rectifier circuit gate signal generation unit 62 adjusts the shift amount of the phase of some rectifier circuit gate signals from a reference clock CKr based on the received phase offset amount. Drive circuit 64 drives the gates of the switching elements of rectifier circuit 4 based on the gate signal generated by rectifier circuit gate signal generation unit 62.

Figure 2:
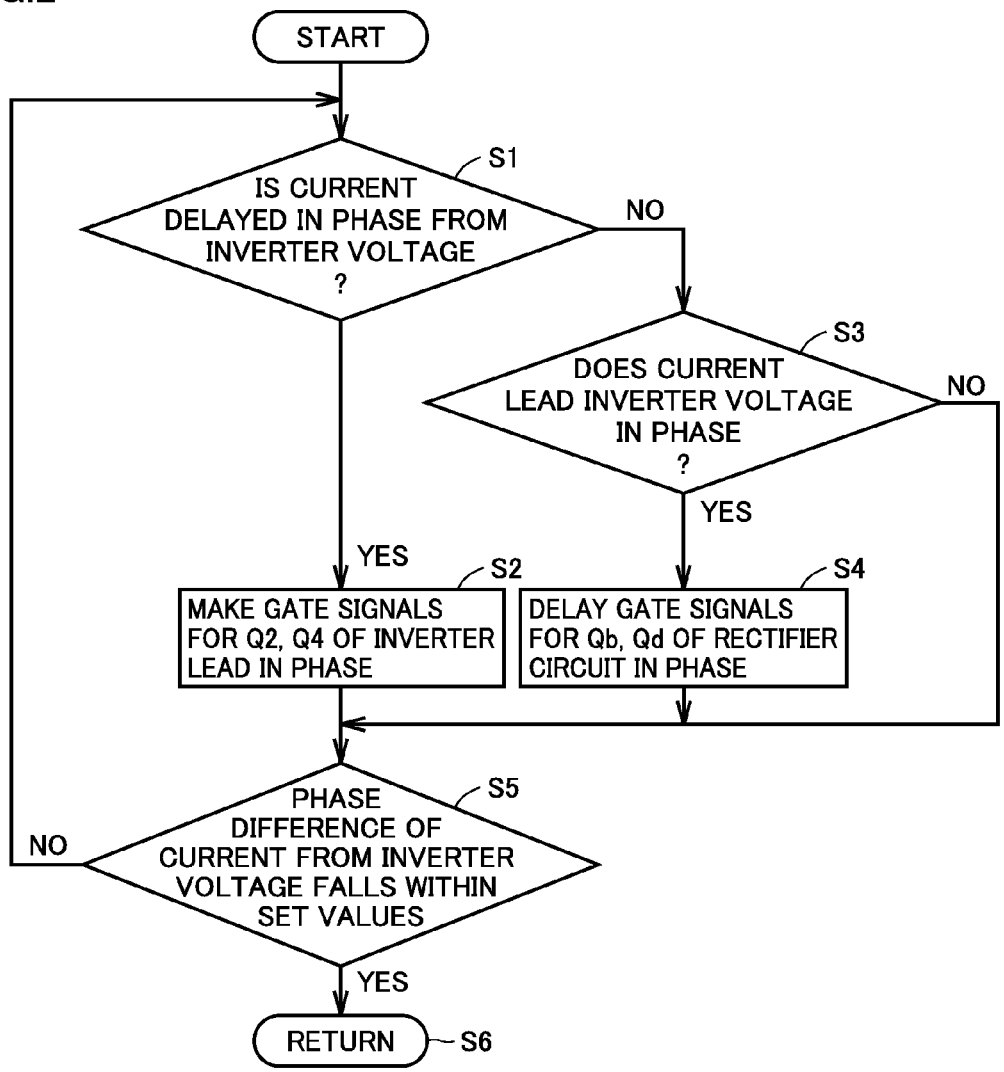
FIG. 2 is a flowchart showing control on correction of phase difference between current and voltage of an inverter.

FIG. 2 is a flowchart showing control on correction of phase difference β between inverter current I(INV) and voltage V(INV). Processing in this flowchart is executed by power transmitting-side controller 5 and power receiving-side controller 6 in coordination with each other. In non-contact power transmitting and receiving system 100, since power reception unit 2B and power transmission unit 2A are arranged at a certain distance and are also electrically isolated from each other, sensor outputs, calculation results of controllers in the both units, and the like are exchanged through communication.

Referring to FIGS. 1 and 2, when the processing of this flowchart is started, it is first determined in step S1 whether or not current I(INV) is delayed in phase from voltage V(INV) of inverter 1 based on the output of voltage-current sensor 12. If it is determined in step S1 as YES (the current is delayed in phase from the voltage), the process is advanced to step S2. In step S2, the switching timing is determined such that the phase of gate signals G(Q2) and G(Q4) for switching elements Q2 and Q4 (arm 1B) of inverter 1 leads the phase in previous processing by a shift amount α (also see FIGS. 3 and 4 which will be described later).

On the other hand, if it is determined in step S1 as NO (the current is not delayed from the voltage), the process is advanced to step S3. In step S3, it is determined whether or not the phase of current I(INV) leads voltage V(INV) of inverter 1 based on the output of voltage-current sensor 12. If it is determined in step S3 as YES (the current leads the voltage), the process is advanced to step S4. If it is determined in step S3 as NO, the process is advanced to step S5.

In step S4, the switching timing is determined such that the phase of gate signals G(Qb) and G(Qd) for switching elements Qb and Qd (arm 4B) of rectifier circuit 4 is delayed from the phase in previous processing by a shift amount β (also see FIGS. 6 and 7 which will be described later).

When the processing in step S2 or step S4 is terminated, the process is advanced to step S5.

In step S5, it is determined whether or not phase difference θ of current I(INV) from voltage V(INV) of inverter 1 falls within set values. The set values are set such that the power factor in the power transmitting apparatus attains a desired value.

In step S5, if it is determined as NO (the phase difference does not fall within the set values), the process is returned again to step S1, where timing of switching of arm 1B or arm 4B is adjusted. If it is determined in step S5 as YES (the phase difference falls within the set values), the process is advanced to step S6 to return the process to the main routine.

Phase shift amounts α and β, which are control inputs in step S2 and step S4, respectively, are calculated using PI control and determined. Alternatively, phase shift amounts α and β may be calculated using a method of shifting the phase shift amount by a certain amount (fixed amount).

Figure 3:
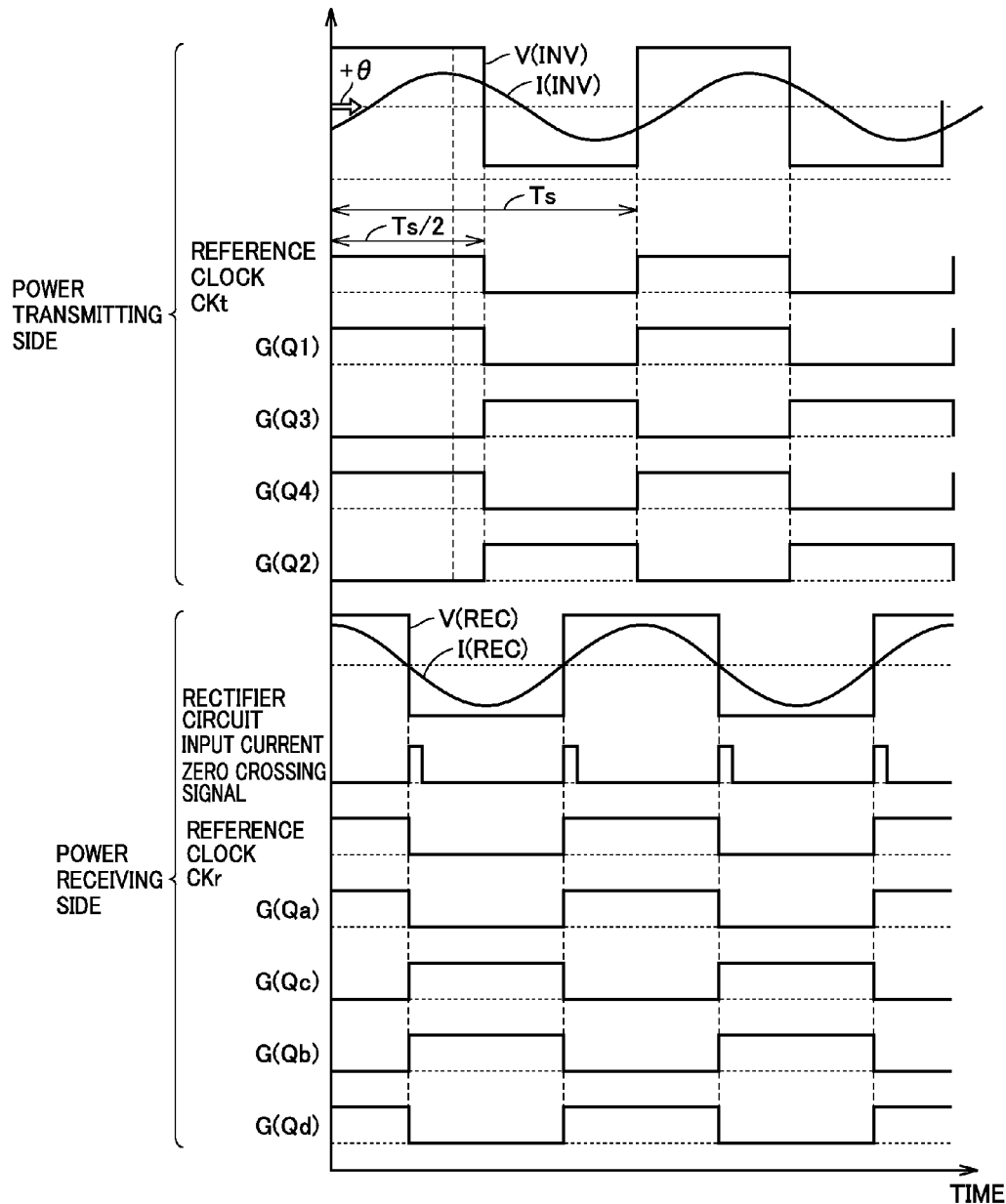
FIG. 3 is a diagram showing operation waveforms obtained when current is delayed in phase from voltage.

Hereinafter, the mechanism in which the power factor is improved by the control shown in FIG. 2 described above will be described with reference to FIGS. 3 to 7. FIG. 3 is a diagram showing operation waveforms obtained when current I(INV) is delayed in phase from voltage V(INV) by +θ. Since inverter 1 generates a high-frequency alternating current, voltage V(INV) presents a square wave.

In inverter 1, complementary gate signals G(Q1), G(Q3) and G(Q2), G(Q4) are supplied to switching elements Q1, Q3 and Q2, Q4, respectively, to perform a complementary operation. In rectifier circuit 4, complementary gate signals G(Qa), G(Qc) and G(Qb), G(Qd) are supplied to switching elements Qa, Qc and Qb, Qd, respectively, to perform a complementary operation.

Reference clock CKt presents a waveform having a cycle Ts and a pulse width of Ts/2. Each element operates at the same duty of 50% as reference clock CKt. Switching elements Q1 and Q4 are respectively controlled by gate signals G(Q1) and G(Q4) synchronized with reference clock CKt. Switching elements Qa and Qd are respectively controlled by gate signal G(Qa) and G(Qd) synchronized with reference clock CKr. Reference clock CKt on the power receiving side is generated based on a zero crossing signal generated by current zero-crossing detection unit 63 of FIG. 1 based on a zero crossing point across which the current of the power reception coil transitions from minus to plus.

In such a case as shown in FIG. 3, it is determined as YES in step S1 of FIG. 2, and processing in step S2 is executed. By the processing in step S2, the phase delay (+θ) of inverter current I(INV) is improved.

Figure 4:
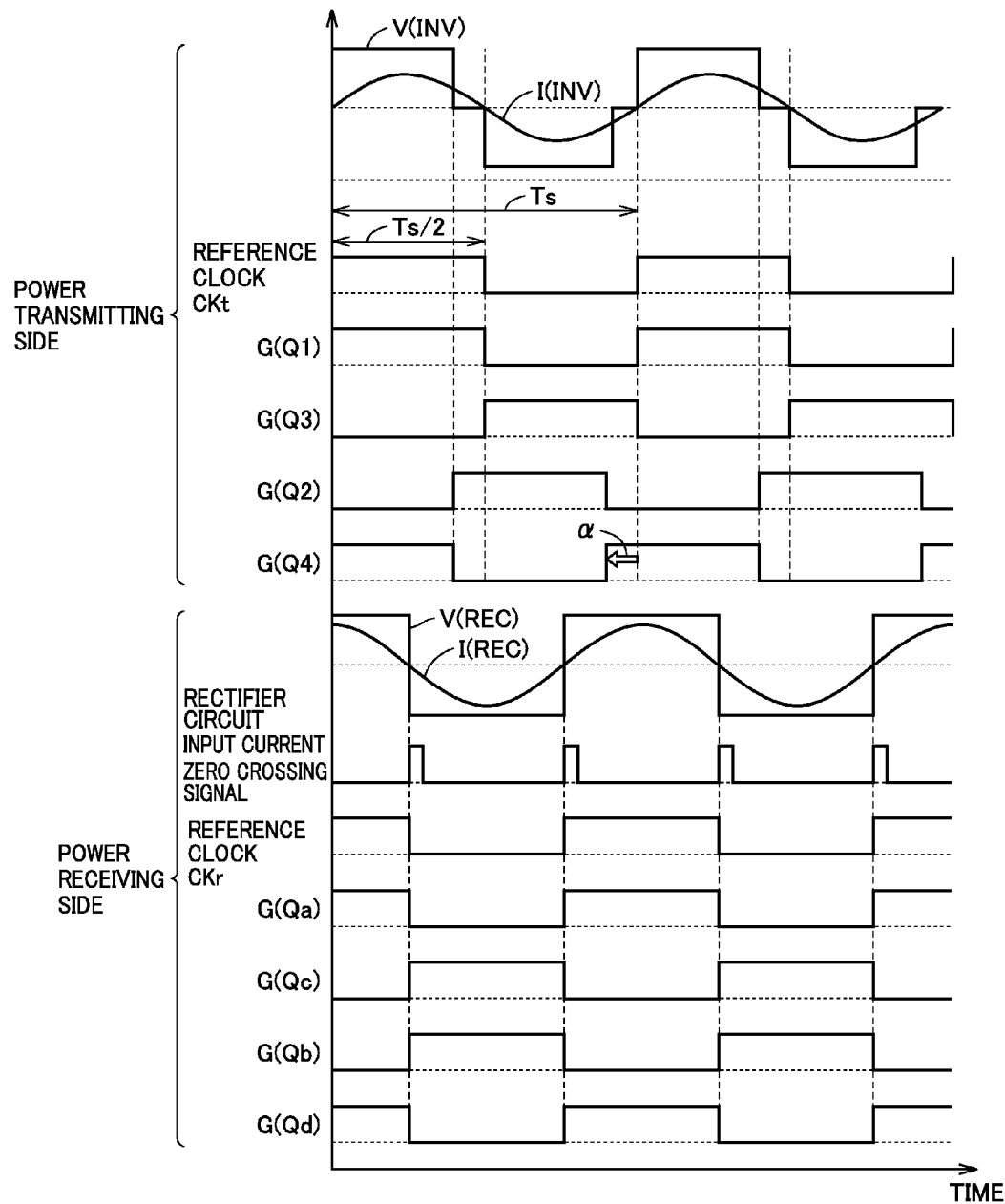
FIG. 4 is a diagram showing operation waveforms obtained by correcting the delay of current of the inverter by controlling switching of the inverter.

FIG. 4 is a diagram showing operation waveforms obtained by correcting the delay of inverter current I(INV) by controlling switching of inverter 1.

Phase offset amount θ is calculated based on voltage-current information on the power transmitting side. As shown in FIG. 3, in the case where the phase of inverter current is delayed from the phase of inverter voltage by +θ, the phase of gate signals G(Q2) and G(Q4) for switching elements Q2 and Q4 of inverter 1 is shifted by α in the direction to lead reference clock CKt as shown in FIG. 4, so that the phase of current I(INV) can be corrected into the leading direction. On this occasion, the duty of gate signals G(Q2) and G(Q4) remains at 50%. The relation between the shift of gate signals G(Q2) and G(Q4) and the phase correction of current will be described with reference to FIG. 5.

Figure 5:
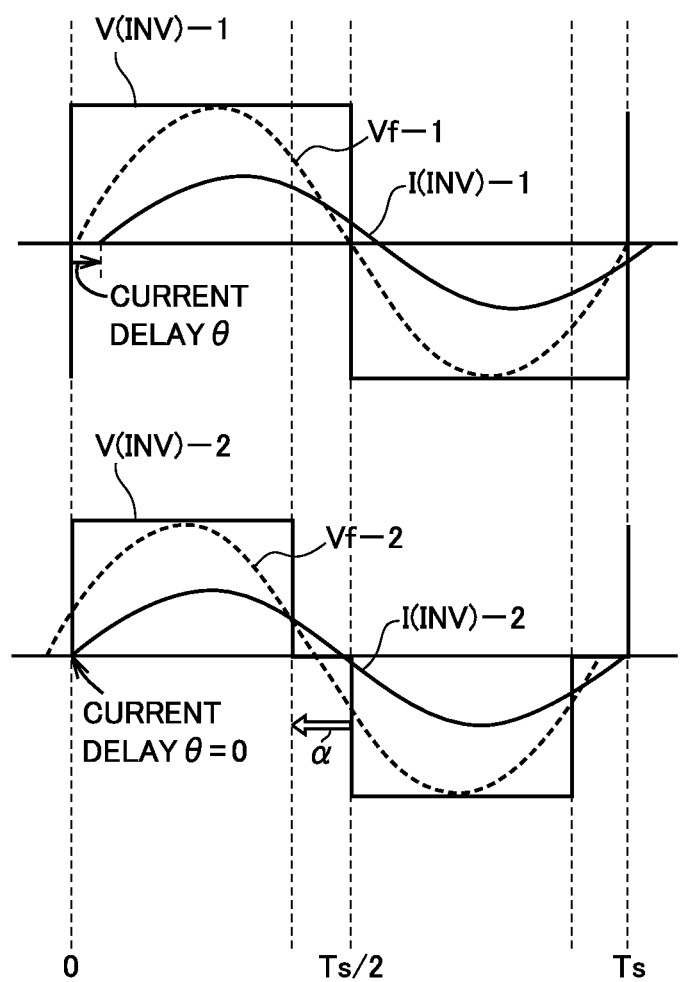
FIG. 5 is a diagram showing one cycle of inverter voltage and current waveforms of FIG. 3 and one cycle of inverter voltage and current waveforms of FIG. 4 in line with each other for comparison.

FIG. 5 is a diagram showing one cycle of inverter voltage and current waveforms of FIG. 3 and one cycle of inverter voltage and current waveforms of FIG. 4 in line with each other for comparison.

Referring to FIG. 5, a voltage V(INV)-1 and a current I(INV)-1 indicate inverter voltage and current waveforms of FIG. 3, and a voltage V(INV)-2 and a current I(INV)-2 indicate inverter voltage and current waveforms of FIG. 4. Voltages Vf-1 and Vf-2 indicate fundamental wave components of voltages V(INV)-1 and V(INV)-2, respectively.

In the case of voltage V(INV)-1 and current I(INV)-1 (in the case where the shift amount of gate signals G(Q2) and G(Q4) is zero) as shown at the upper part, the start time of one cycle of fundamental component Vf-1 of inverter output voltage matches the start time of one cycle of voltage V(INV)-1 of a square wave (the ON time of Q1) (at time θ). On the other hand, the zero crossing point of current I(INV)-1 is delayed by phase θ.

On the other hand, as shown at the lower part, in the case where the shift amount of gate signals G(Q2) and G(Q4) is α, voltage V(INV)-2 presents a square wave in which it assumes zero in a partial section. In that case, comparing the start times of one cycle, fundamental wave component Vf-2 leads voltage V(INV)-2 in phase. This is clear from the Fourier series expansion of the square wave voltage.

The phase of inverter current I(INV) is determined with respect to the fundamental wave component of voltage V(INV). Therefore, when shift amount a is set, voltage V(INV) has a zero section to present a voltage waveform having a duty ratio of less than or equal to 50%. Thus, the fundamental wave component of voltage V(INV) has a leading phase, and accordingly, inverter current I(INV) also leads in phase.

By adjusting shift amount a at a suitable value, it is possible to make the rise timing of voltage V(INV)-2 (square wave) from zero coincide with the starting point of one cycle of current I(INV)-2, as shown in the waveform at the lower part. With such adjustment, the power factor in the inverter is improved.

Figure 6:
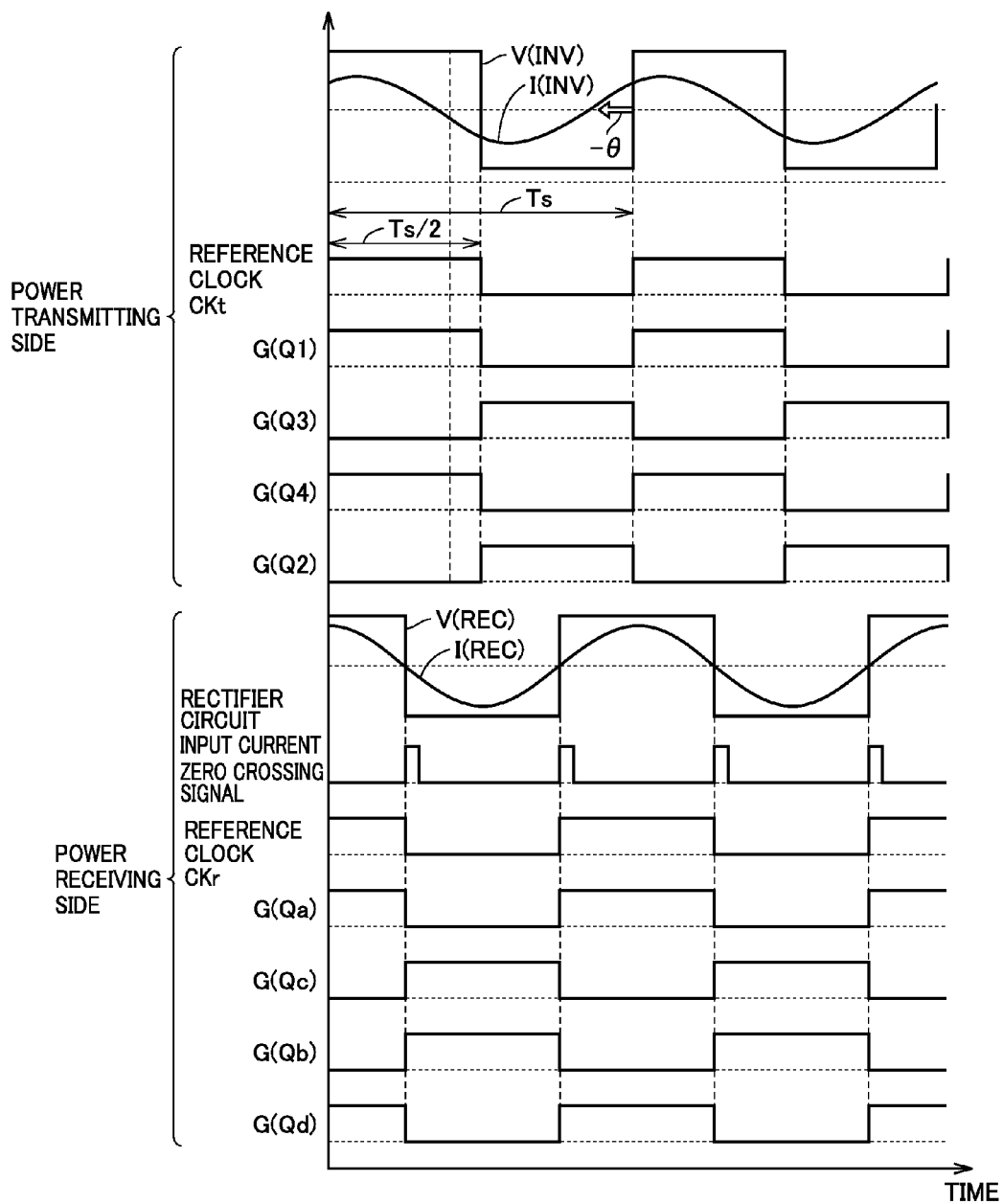
FIG. 6 is a diagram showing operation waveforms obtained when current leads voltage.

FIG. 6 is a diagram showing operation waveforms obtained when the current leads the voltage. In the case as shown in FIG. 6, it is determined as NO in step S1 of FIG. 2, and the processing in step S3 is executed. By the processing in step S3, the phase lead (−θ) of the inverter current is improved.

Figure 7:
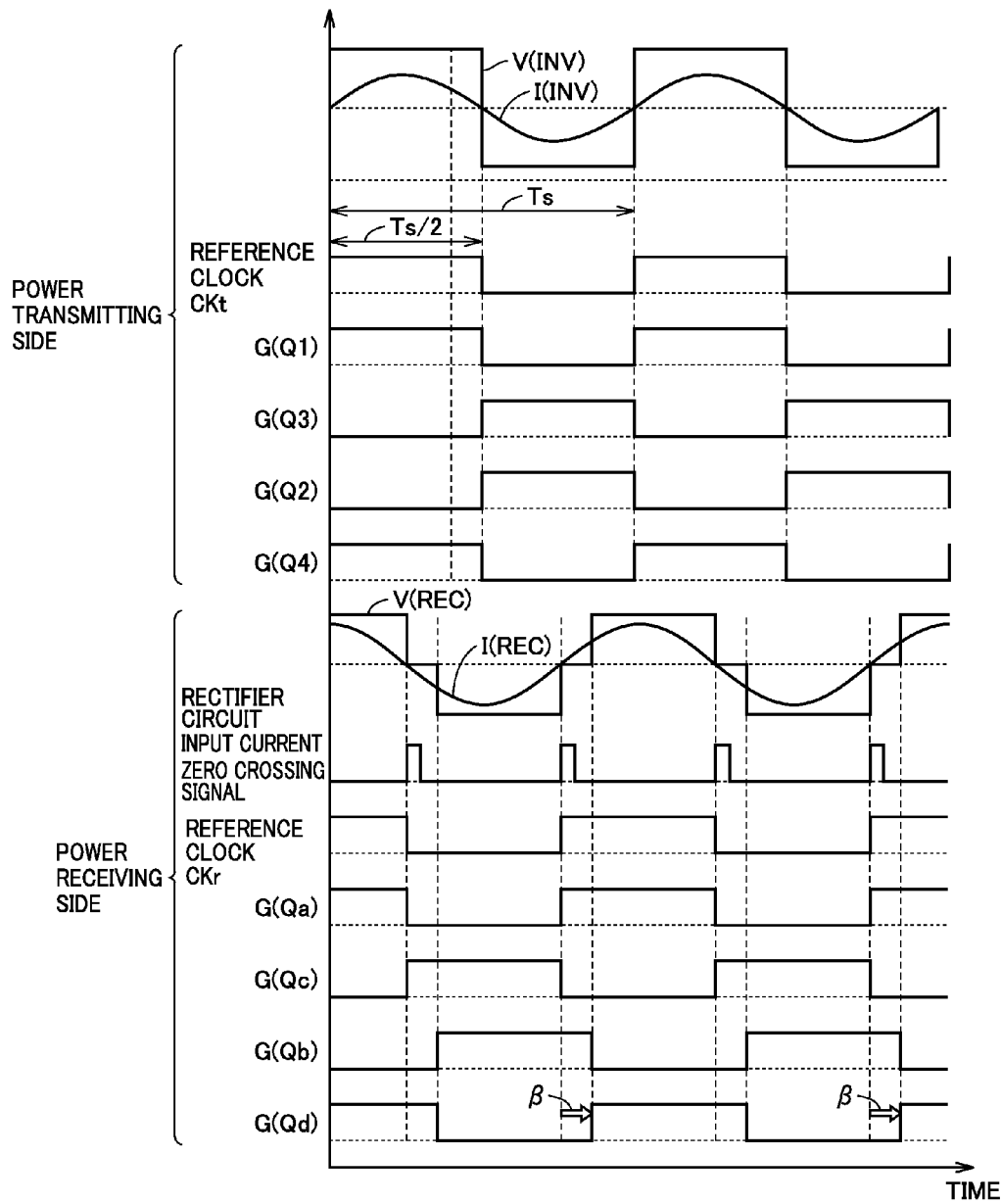
FIG. 7 is a diagram showing operation waveforms obtained by correcting the phase lead of inverter current by controlling switching of a rectifier circuit.

FIG. 7 is a diagram showing operation waveforms obtained by correcting the phase lead of inverter current I(INV) by controlling switching of rectifier circuit 4.

In the case where inverter current I(INV) leads voltage V(INV) in phase, the conduction periods overlap before switching element Q1 or Q3 of the inverter is completely turned off, causing hard switching, which increases switching losses. Thus, power feed efficiency deteriorates not only because of increase in apparent power (deterioration in power factor) but also because of increase in inverter loss.

In the case where the current leads the voltage in phase (by −θ) as indicated by the arrow in FIG. 6, the gate signal for switching element Qd of rectifier circuit 4 is shifted in phase by β in the direction to be delayed from reference clock CKr on the receiving side as indicated by the two arrows in FIG. 7. The gate signal for switching element Qb is also shifted in phase by β similarly to the phase of the gate signal for switching element Qd.

The configuration as shown in FIG. 1 where capacitor Cs1 is inserted in series with non-contact power feed coil 21 on the primary side, and capacitor Cs2 is inserted in series with non-contact power feed coil 22 on the secondary side is called an S-S system. When configuring the circuit such that the coil and the capacitor are connected in series both on the primary side and the secondary side and such that resonance occurs on the primary side and the secondary side in the S-S system, the following relation of the primary-side voltage and the primary-side current with the secondary-side voltage and the secondary-side current will hold.

Specifically, when the voltage and current are in phase in coil 22 on the secondary side, the voltage and current are also in phase in coil 21 on the primary side, while when the current leads the voltage in phase in coil 22 on the secondary side, the current is delayed in phase from the voltage in coil 21 on the primary side.

That is, when the current phase of the inverter leads the output voltage of the inverter, the current of rectifier circuit 4 is adjusted to lead the voltage in phase by forcibly providing a zero voltage period for the square wave of the voltage of the rectifier circuit on the secondary side to change the phase of the voltage fundamental wave component.

With such shifting of the switching phase of the gate signals, the phase of inverter current I(INV) can be corrected into the delayed direction. This can achieve improvement in power factor as well as reduction in inverter loss.

As described, according to the first embodiment, improvement in power factor can be achieved by adjusting the timing of gate signals with respect to phase shift. Therefore, transmission efficiency of the non-contact power transmitting and receiving system can be improved without changing the frequency of the inverter or increasing circuits.

Figure 8:
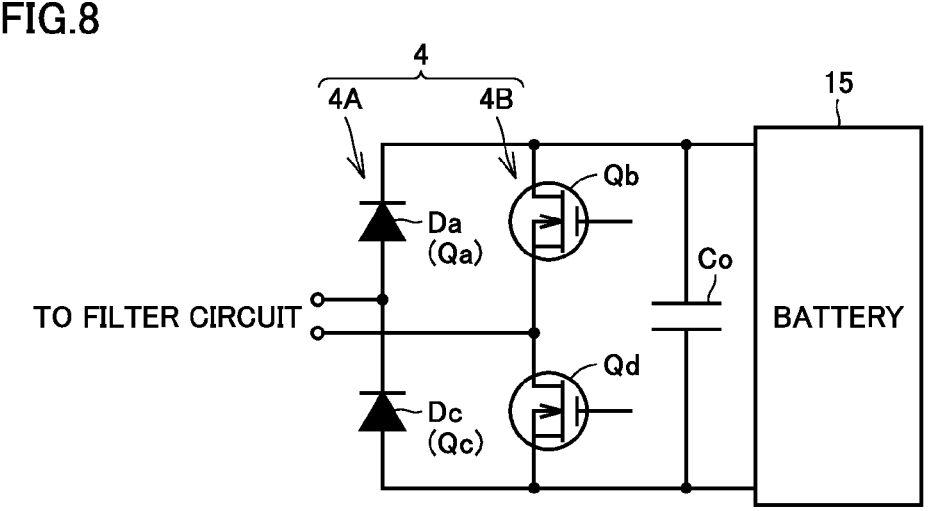
FIG. 8 is a circuit diagram obtained by implementing Qa and Qc of the rectifier circuit by diodes Da and Dc instead of MOSFETs.

Although the rectifier circuit shown in FIG. 1 is of a full bridge type, it is not limited to this but may have a configuration as shown in FIG. 8.

FIG. 8 is a circuit diagram obtained by implementing Qa and Qc of the rectifier circuit by diodes Da and Dc instead of MOSFETs. Since the phase can be shifted in arm 4B if Qb and Qd are switching elements, effects similar to those of FIG. 7 can be obtained. Alternatively, switching elements Qa and Qc may be controlled to assume a stop state to make parasitic diodes of switching elements Qa and Qc operate as diodes Da and Dc, without replacing switching elements Qa and Qc by diodes.

Moreover, in the first embodiment, the switching timing of switching elements Q2 and Q4 is shifted while fixing the switching timing of switching elements Q1 and Q3 of inverter 1, as shown in FIG. 4. Conversely, the switching timing of switching elements Q1 and Q3 may be shifted while fixing the switching timing of switching elements Q2 and Q4.

Similarly, in the first embodiment, the switching timing of switching elements Qb and Qd is shifted while fixing the switching timing of switching elements Qa and Qc of rectifier circuit 4, as shown in FIG. 7. Conversely, the switching timing of switching elements Qa and Qc may be shifted while fixing the switching timing of switching elements Qb and Qd.

Second Embodiment

The first embodiment shows the example of shifting the phase of switching of the inverter or switching of the rectifier circuit in accordance with the phase difference between the inverter current and the inverter voltage. In the second embodiment, an example of shifting the phase of the rectifier circuit further taking charging power and a receiving-terminal voltage-current ratio into consideration, and correcting the phase shift amount in accordance with the phase difference between the inverter current and the inverter voltage will be described.

Figure 9:
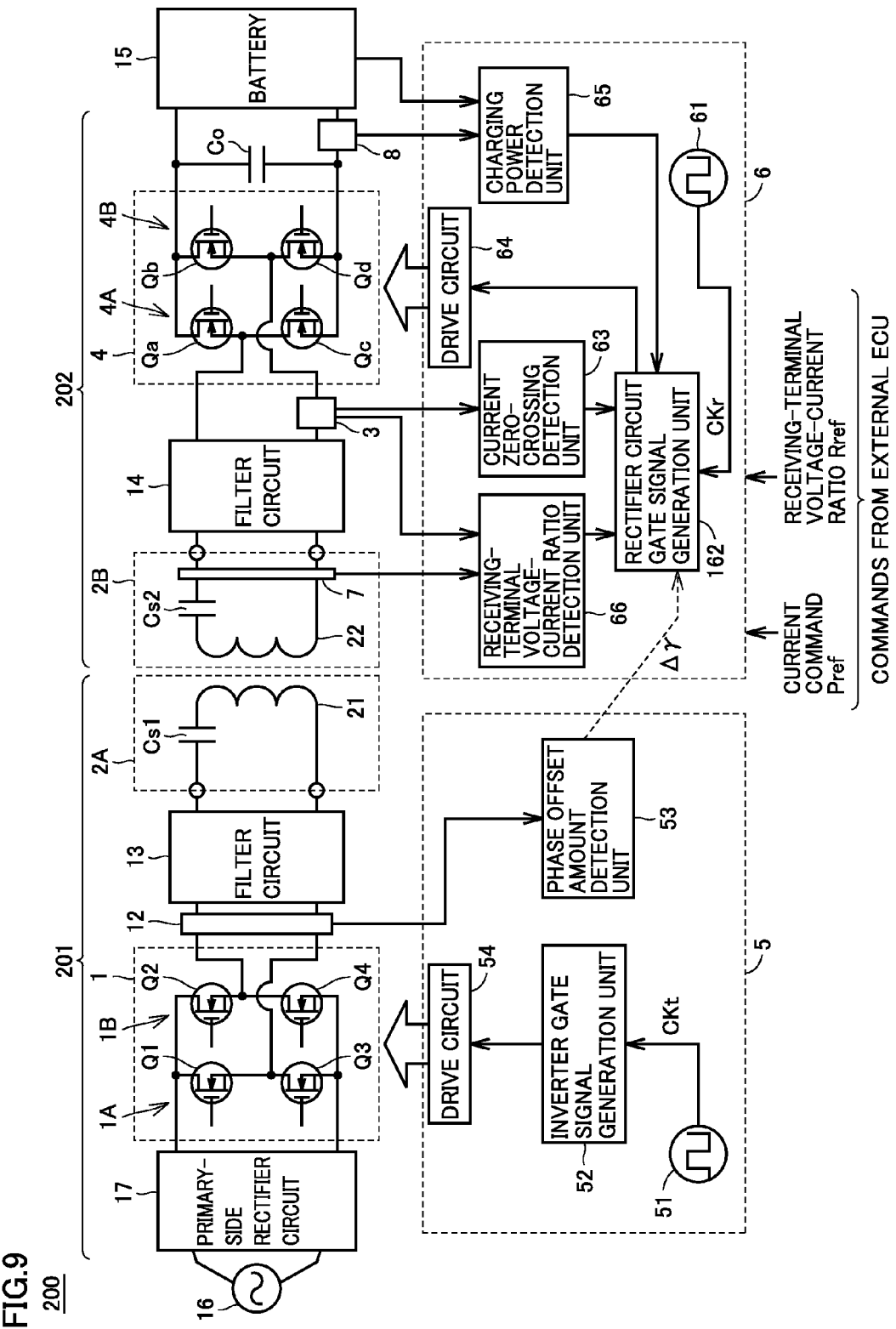
FIG. 9 is an overall configuration diagram of a non-contact power transmitting and receiving system of a second embodiment.

FIG. 9 is an overall configuration diagram of a non-contact power transmitting and receiving system of the second embodiment.

In addition to the configuration of non-contact power transmitting and receiving system 100 shown in FIG. 1, a non-contact power transmitting and receiving system 200 shown in FIG. 9 further includes a receiving terminal voltage detection unit 7 and a battery current detection unit 8. Power receiving-side controller 6 additionally includes a charging power detection unit 65 for a battery and a receiving-terminal voltage-current ratio (=equivalent load resistance) detection unit 66, and rectifier circuit gate signal generation unit 62 is replaced by a rectifier circuit gate signal generation unit 162. Power receiving-side controller 6 receives a power command Pref and a receiving-terminal voltage-current ratio command Rref from an external ECU.

In the second embodiment, switching control is performed only on the side of rectifier circuit 4 without adjusting the switching of inverter 1 to control charging power of battery 15 or control the receiving-terminal voltage-current ratio and to correct the phase of inverter current I(INV).

Figure 10:
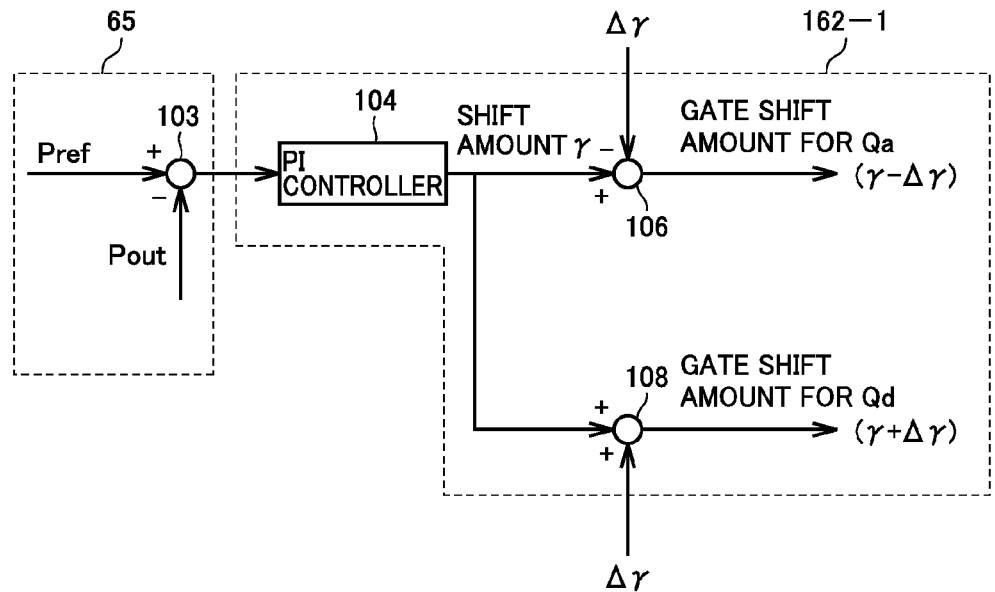
FIG. 10 is a control block diagram when controlling battery charging to be constant.

FIG. 10 is a control block diagram when controlling battery charging to be constant. The block diagram shown in FIG. 10 shows a functional block of processing of calculating the shift amount of gate signals G(Qa) and G(Qb) calculated in charging power detection unit 65 of FIG. 9 and transmitted to rectifier circuit gate signal generation unit 162. Charging power detection unit 65 includes a subtracter 103. A rectifier circuit gate signal generation unit 162-1 includes a subtracter 106, an adder 108, and a PI controller 104. Rectifier circuit gate signal generation unit 162-1 shows a configuration of a portion added to rectifier circuit gate signal generation unit 62 of FIG. 1.

In FIG. 10, Pout indicates charging power, Pref indicates a command value for charging power, and γ indicates the shift amount calculated in PI controller 104. A correction value for providing a difference in switching timing between switching elements Qa and Qd is denoted by Δγ, and is determined based on the phase difference between the inverter current and the voltage, similarly to α and β in the first embodiment.

Here, when inverter current I(INV) leads inverter output voltage V(INV) in phase, Δγ>θ holds, and when inverter current I(INV) is delayed from inverter output voltage V(INV) in phase, Δγ<θ holds.

Figure 11:
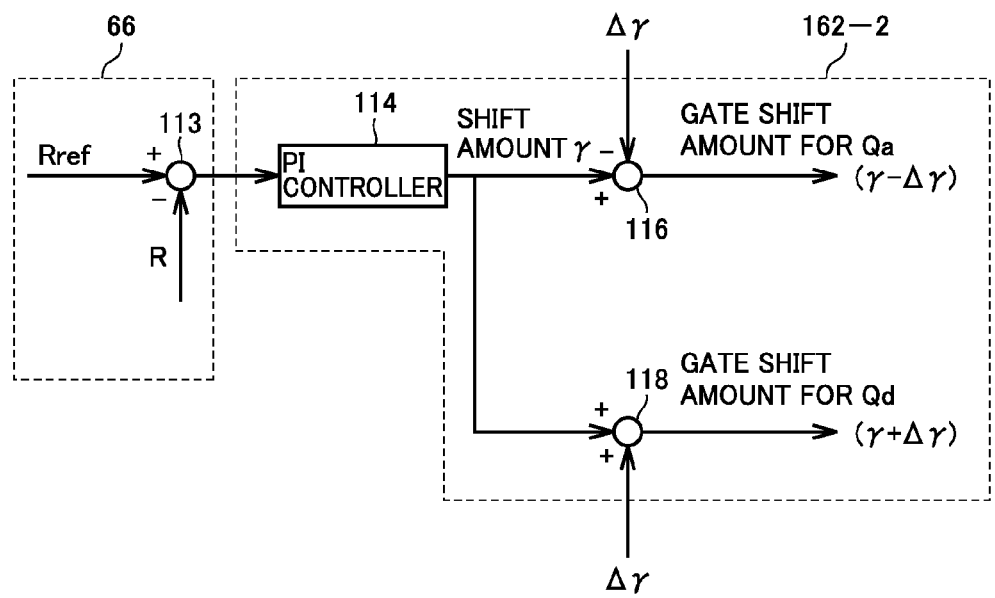
FIG. 11 is a control block diagram when controlling a receiving-terminal voltage-current ratio to be constant.

FIG. 11 is a control block diagram when controlling the receiving-terminal voltage-current ratio to be constant. The block diagram of FIG. 11 shows a functional block of processing of calculating the shift amount of gate signals G(Qa) and G(Qb) calculated in receiving-terminal voltage-current ratio detection unit 66 of FIG. 9 and transmitted to rectifier circuit gate signal generation unit 162. Receiving-terminal voltage-current ratio detection unit 66 includes a subtracter 113. A rectifier circuit gate signal generation unit 162-2 includes a subtracter 116, an adder 118, and a PI controller 114. Rectifier circuit gate signal generation unit 162-2 shows a configuration of a portion added to rectifier circuit gate signal generation unit 62 of FIG. 1.

In FIG. 11, R indicates the voltage-current ratio (equivalent load resistance) of the receiving-terminal voltage, Rref indicates a command value for the equivalent load resistance, and γ indicates the shift amount calculated in PI controller 114. A correction value for providing a difference in switching timing between switching elements Qa and Qd is denoted by Δγ, and is determined based on the phase difference between the inverter current and the voltage, similarly to α and β in the first embodiment.

Here, when inverter current I(INV) leads inverter output voltage V(INV) in phase, Δγ>θ holds, and when inverter current I(INV) is delayed from inverter output voltage V(INV) in phase, Δγ<θ holds.

Conventionally (e.g., a technique disclosed in Japanese Patent Laying-Open No. 2002-354711), a step-up chopper circuit is separately provided after the rectifier circuit to perform charging control and load resistance control. With this configuration, it is possible to control charging power and to control the receiving-terminal voltage-current ratio, however, control of the phase difference between the inverter voltage and current is difficult to achieve. For that reason, size increase of the circuit due to the addition of the step-up chopper circuit and reduction in efficiency due to increase in losses resulting from an additional circuit (a reactor and a switching element) have been caused conventionally. On the other hand, in the second embodiment, reduction in size and cost can be achieved, and further, the phase difference between the inverter voltage and current can also be controlled. Thus, increase in efficiency can be achieved while improving control flexibility of the whole system.

Figure 12:
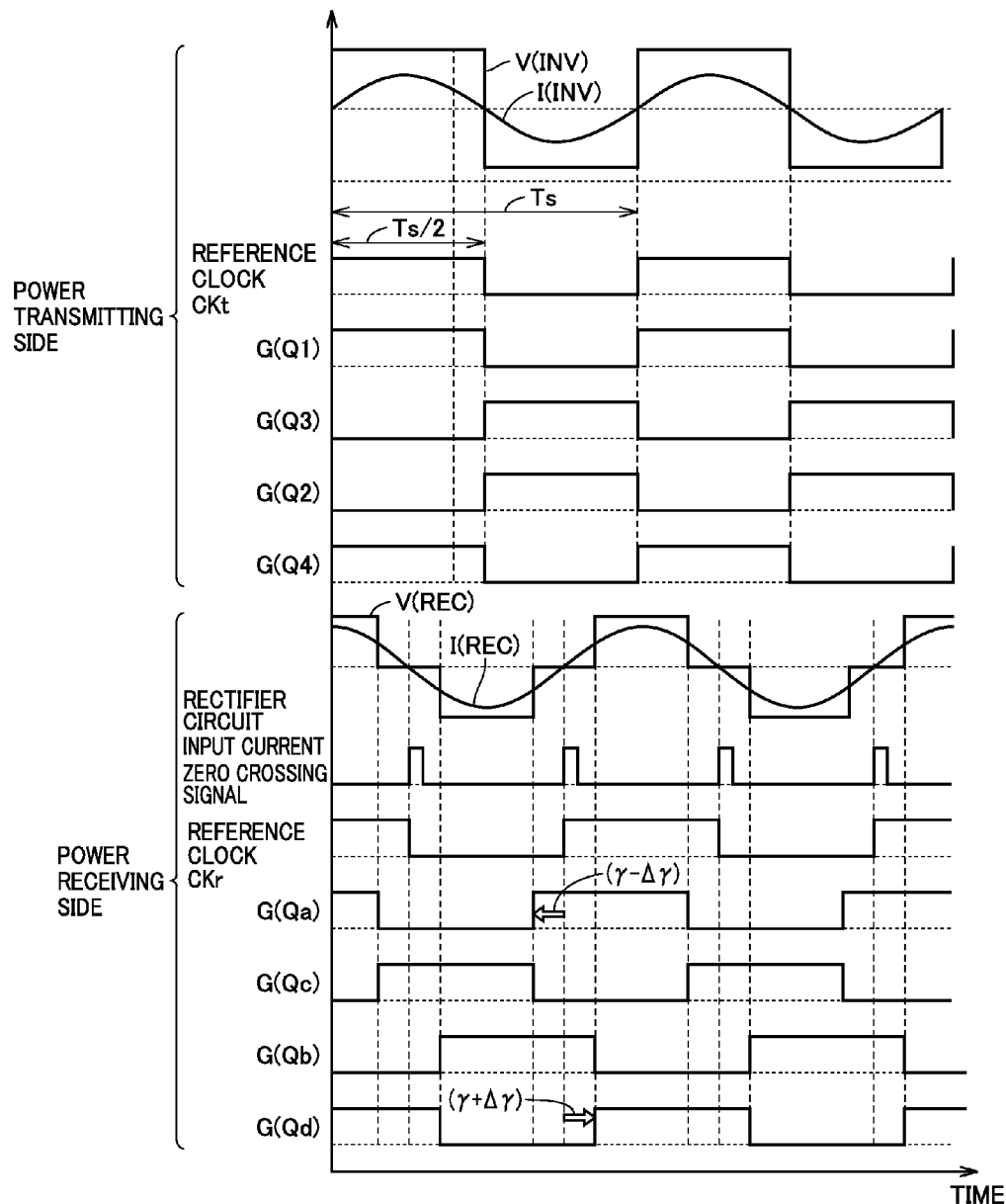
FIG. 12 is a first diagram showing operation waveforms in the second embodiment.
Figure 13:
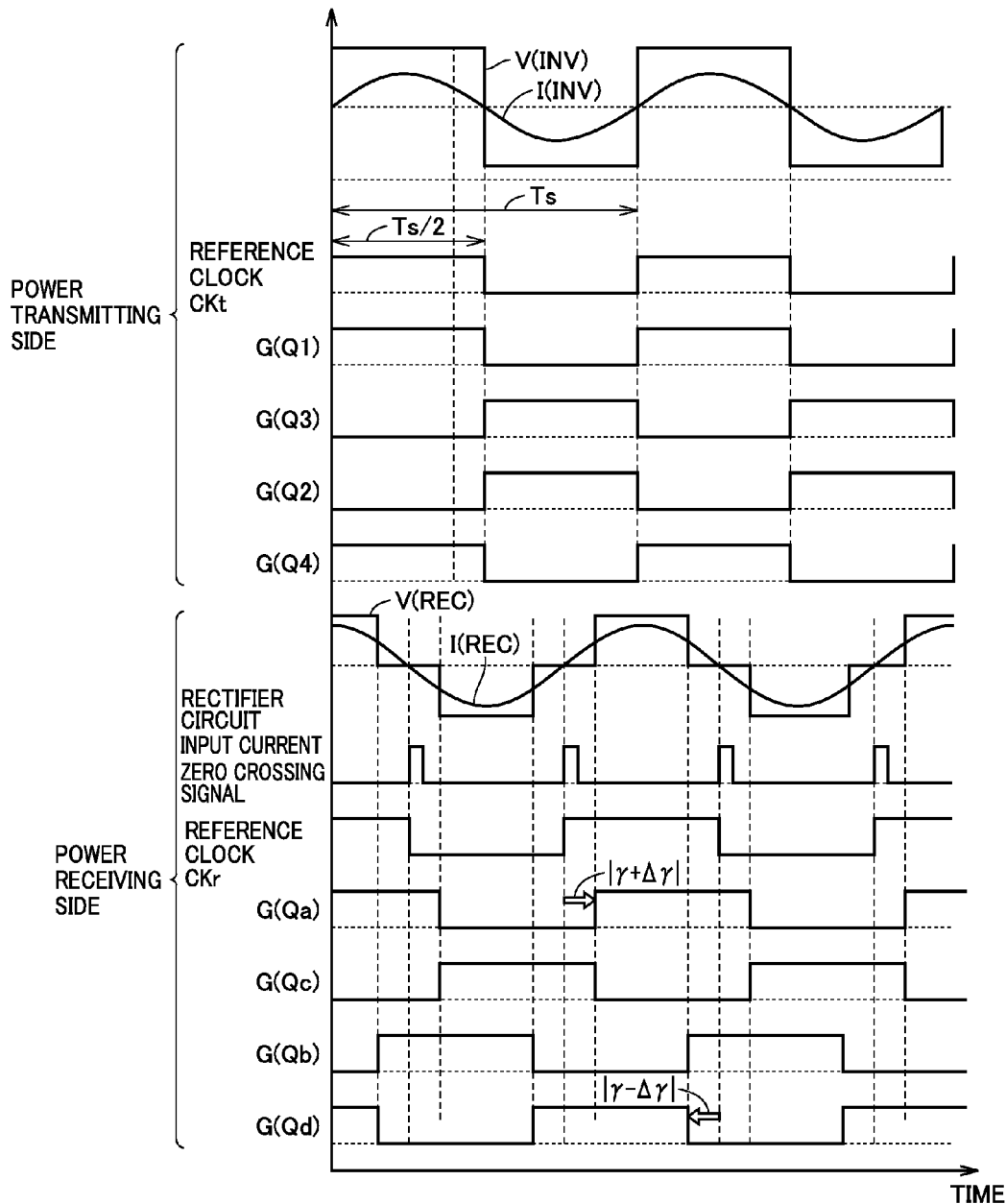
FIG. 13 is a second diagram showing operation waveforms in the second embodiment.

With the configuration shown in FIG. 10 or FIG. 11, phase shift amount γ is calculated in response to power command Pref or equivalent load resistance command Rref. PI controller 104 or 114 is used for this calculation. FIG. 12 is a first diagram showing operation waveforms in the second embodiment. FIG. 13 is a second diagram showing operation waveforms in the second embodiment.

In FIG. 12, gate signal G(Qa) for switching element Qa is shifted in phase by (γ−Δγ) in the direction to lead reference clock CKr. Gate signal G(Qd) for switching element Qd is shifted in phase by (γ+Δγ) in the direction to lead reference clock CKr. Basic shift amount γ is calculated by PI controller 104 of FIG. 10 or PI controller 114 of FIG. 11. Phase correction amount Δγ is determined in accordance with the current phase of the primary-side inverter.

When basic shift amount γ>θ holds and γ is larger than Δγ, waveforms as those shown in FIG. 12 are obtained. Gate signals G(Qa) and G(Qc) are shifted in phase in the direction to lead the reference clock, and gate signals G(Qb) and G(Qd) are shifted in the direction to be delayed from the reference clock.

When basic shift amount γ<θ holds and |γ| is larger than Δγ, waveforms as those shown in FIG. 13 are obtained. Gate signals G(Qa) and G(Qc) are shifted in the direction to be delayed from the reference clock, and gate signals G(Qb) and G(Qd) are shifted in the direction to lead the reference clock.

With the above-described control, the power factor of inverter 1 can be improved merely by changing the switching timing in rectifier circuit 4, without changing the switching timing in inverter 1.

To prevent switching elements from being simultaneously turned on at the time of switching, a dead time may be provided during which upper and lower switching elements of the same arm are simultaneously turned off in the inverter and the rectifier circuit.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-contact power transmitting and receiving system, comprising:
   an inverter configured to generate a high-frequency voltage from a DC power supply on a power transmitting side;
   a detection device configured to detect a phase difference between an output voltage and an output current of said inverter;
   a power transmission coil connected to said inverter;
   a power reception coil configured to receive electric power from said power transmission coil in a contactless manner;
   a rectifier circuit configured to rectify AC power received at said power reception coil to a direct current; and
   a control unit configured to control said inverter and said rectifier circuit,
   said inverter including a plurality of arms connected in parallel across a power transmitting-side positive line and a power transmitting-side negative line which are supplied with a DC voltage from said DC power supply on the power transmitting side, said rectifier circuit including a plurality of other arms connected in parallel across a power receiving-side positive line and a power receiving-side negative line which are supplied with a DC voltage rectified by said rectifier circuit, said control unit adjusting at least one of switching timing of any arm of said inverter and switching timing of any arm of said rectifier circuit, in accordance with said phase difference detected by said detection device.

2. The non-contact power transmitting and receiving system according to claim 1, wherein said inverter includes a first arm and a second arm as said plurality of arms, and when the output current of said inverter is delayed in phase from the output voltage of said inverter, said control unit controls said inverter such that the switching timing of said first arm leads a reference clock for said inverter.

3. The non-contact power transmitting and receiving system according to claim 1, wherein said rectifier circuit includes a third arm and a fourth arm as said plurality of other arms, and when the output current of said inverter leads the output voltage of said inverter in phase, said control unit controls said rectifier circuit such that the switching timing of said third arm is delayed from a reference clock for said rectifier circuit.

4. The non-contact power transmitting and receiving system according to claim 3, wherein said third arm includes two switching elements connected in series across said power receiving-side positive line and said power receiving-side negative line, and said fourth arm includes two diodes connected in series across said power receiving-side positive line and said power receiving-side negative line.

5. The non-contact power transmitting and receiving system according to claim 1, wherein said rectifier circuit includes a third arm and a fourth arm as said plurality of other arms, and in accordance with the phase difference detected by said detection device, said control unit controls said rectifier circuit such that the switching timing of said third arm is delayed from and the switching timing of said fourth arm leads a reference clock for said rectifier circuit.

* * * * *